US011281430B2

(12) United States Patent
Kitazawa et al.

(10) Patent No.: US 11,281,430 B2
(45) Date of Patent: Mar. 22, 2022

(54) RANDOM NUMBER GENERATION DEVICE, INFORMATION PROCESSING DEVICE, AND RANDOM NUMBER GENERATION METHOD

(71) Applicant: PANASONIC CORPORATION, Osaka (JP)

(72) Inventors: Atsurou Kitazawa, Fukuoka (JP); Kouji Mutou, Fukuoka (JP); Masaaki Kobayashi, Fukuoka (JP)

(73) Assignee: PANASONIC CORPORATION, Osaka (JP)

( * ) Notice: Subject to any disclaimer, the term of this patent is extended or adjusted under 35 U.S.C. 154(b) by 95 days.

(21) Appl. No.: 16/612,218

(22) PCT Filed: Mar. 16, 2018

(86) PCT No.: PCT/JP2018/010659
§ 371 (c)(1),
(2) Date: Nov. 8, 2019

(87) PCT Pub. No.: WO2018/207463
PCT Pub. Date: Nov. 15, 2018

(65) Prior Publication Data
US 2021/0141606 A1 May 13, 2021

(30) Foreign Application Priority Data
May 12, 2017 (JP) .............................. JP2017-095963

(51) Int. Cl.
*G06F 7/58* (2006.01)
(52) U.S. Cl.
CPC ..................................... *G06F 7/58* (2013.01)
(58) Field of Classification Search
CPC ................................................ G06F 7/58–588
See application file for complete search history.

(56) References Cited

U.S. PATENT DOCUMENTS

| 6,195,669 B1 | 2/2001 | Onodera et al. |
| 2010/0332575 A1* | 12/2010 | Kanter ............... H04L 9/001 708/255 |

(Continued)

FOREIGN PATENT DOCUMENTS

| JP | 11-085472 | 3/1999 |
| JP | 11-085476 | 3/1999 |
| JP | 2016-126518 | 7/2016 |

OTHER PUBLICATIONS

Hirano, K., T. Yamazaki, S. Morikatsu, H. Okumura, H. Aida, A. Uchida, S. Yoshimori, K. Yoshimura, T. Harayama, and P. Davis, "Fast random bit generation with bandwidth-enhanced chaos in semiconductor lasers", Opt. Express 18, 5512-5524, 2010 (Year: 2010).*

(Continued)

*Primary Examiner* — Matthew D Sandifer
(74) *Attorney, Agent, or Firm* — Greenblum & Bernstein, P.L.C.

(57) ABSTRACT

In an information processing device, a fluctuation estimation unit acquires from a noise source a plurality of measured values having bits of M digits, where M is an integer exponent of a power of two. A bit extraction unit acquires information relating to a number of effective bits of N digits used in generating a random number, where N is an integer less than M, based on the acquired plurality of values. Using the information relating to the number of effective bits, a bit coupling unit generates a random number having effective bits of L digits, where L is a predetermined integer greater than or equal to N.

11 Claims, 12 Drawing Sheets

(56) References Cited

U.S. PATENT DOCUMENTS

2016/0179472 A1    6/2016  Sugahara
2016/0216945 A1*   7/2016  Rosea .................... G06F 7/588

OTHER PUBLICATIONS

Kanter, I., Aviad, Y., Reidler, I. et al. "An optical ultrafast random bit generator", Nature Photon 4, 58-61, 2010 (Year: 2010).*
Yu Liu and Mingyi Zhu and Hong Guo, "Truly Random Number Generation via Entropy Amplification", arXiv:1006.3512, 2010 (Year: 2010).*
English Translation of the International Search Report (ISR) from International Searching Authority (Japan Patent Office) in International Pat. Appl. No. PCT/JP2018/010659, dated May 29, 2018.
Uchida et al., "Ultra-fast random number generation with bandwidth-enhanced chaos in semiconductor lasers", IEICE Technical Report, vol. 110, No. 83, pp. 231-234 (Jun. 11, 2010).
Shiraishi et al., "A Random Number Generation Using Prediction Error of Round Trip Time on IP Network", Transactions of the Information Processing Society of Japan, vol. 44, No. 8, pp. 2170-2177 (Aug. 15, 2003).

\* cited by examiner

[FIG. 1]
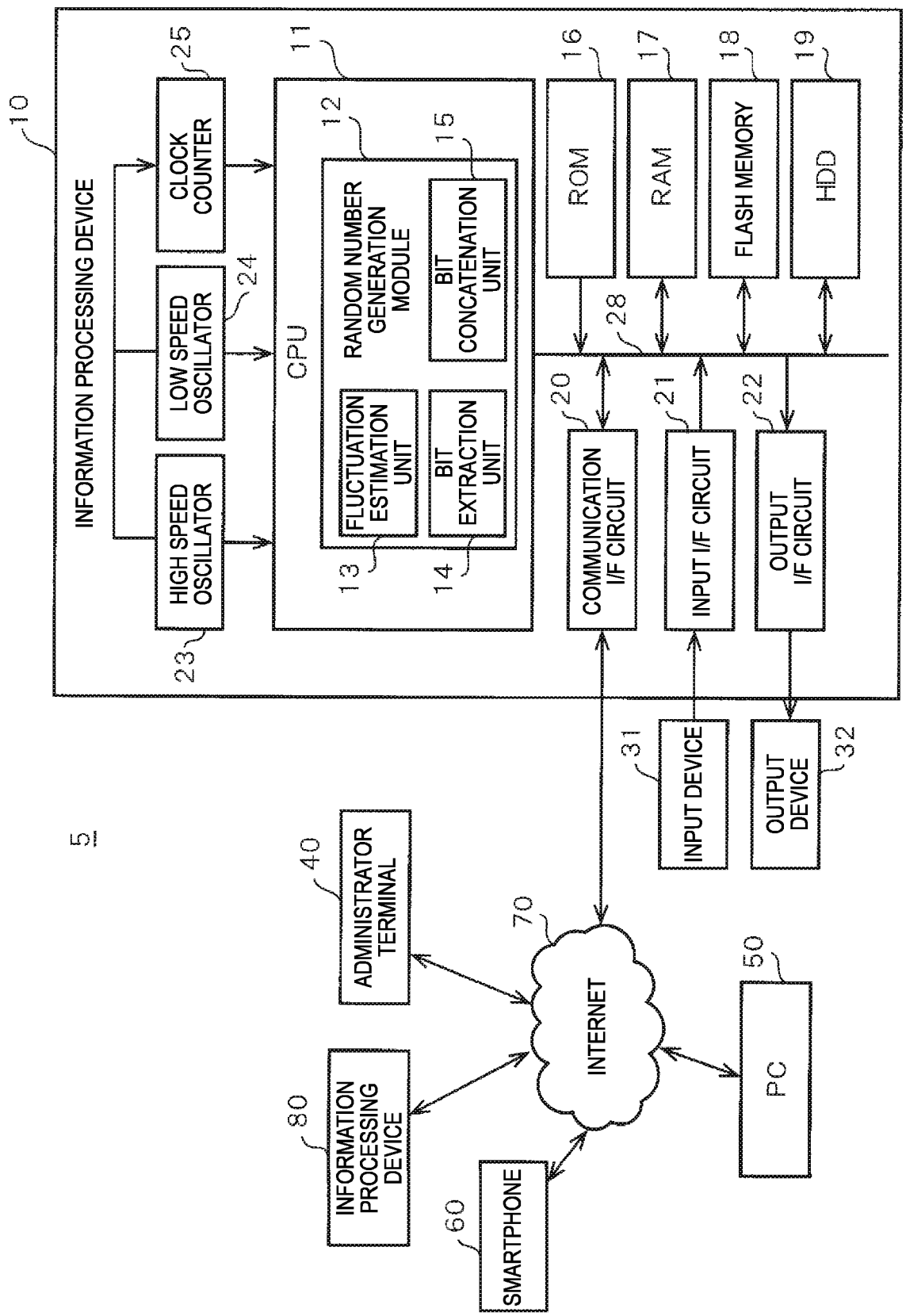

[FIG. 2A]
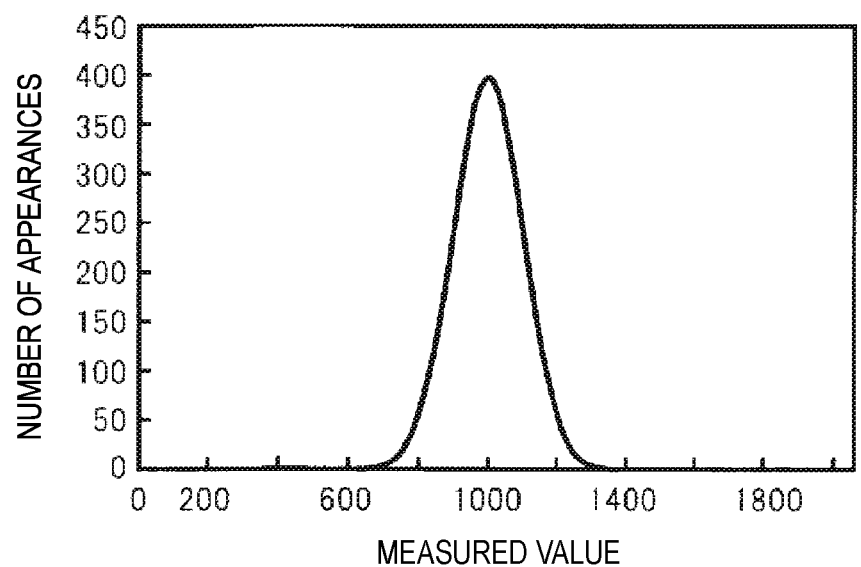
[FIG. 2B]
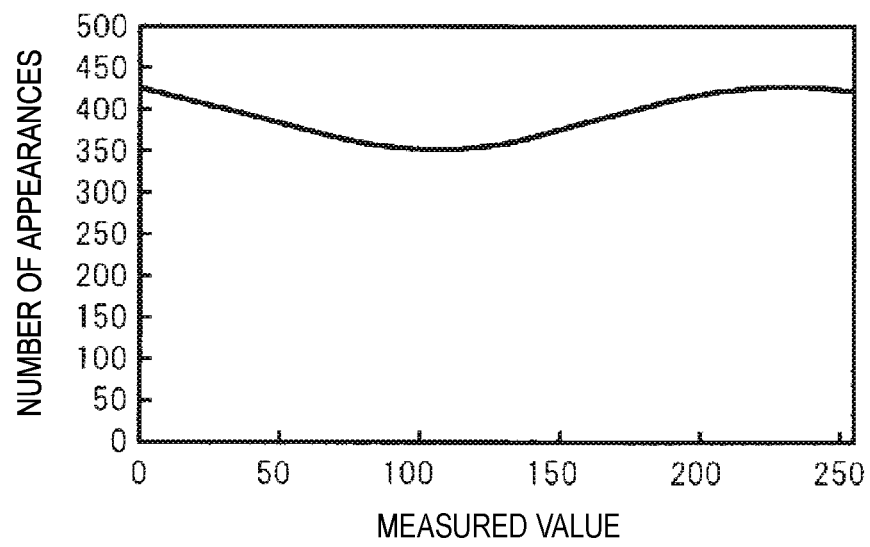

[FIG. 2C]
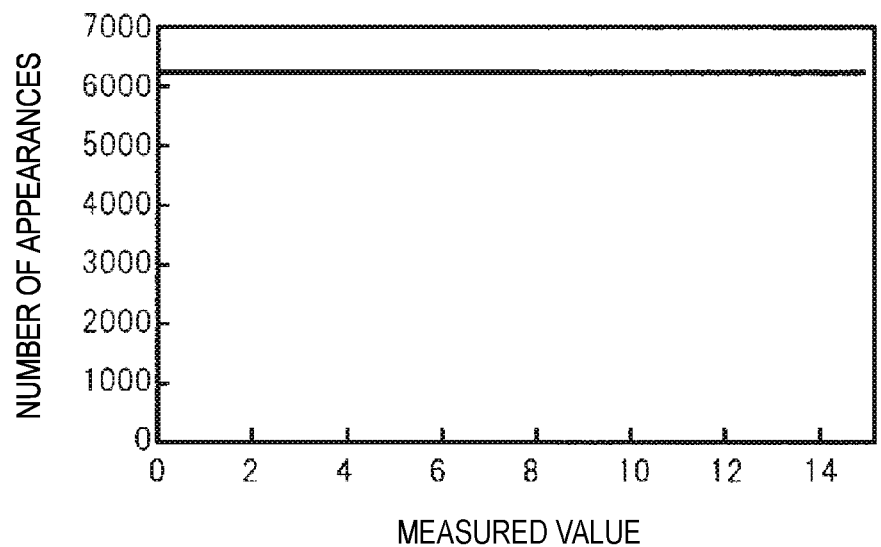
[FIG. 2D]
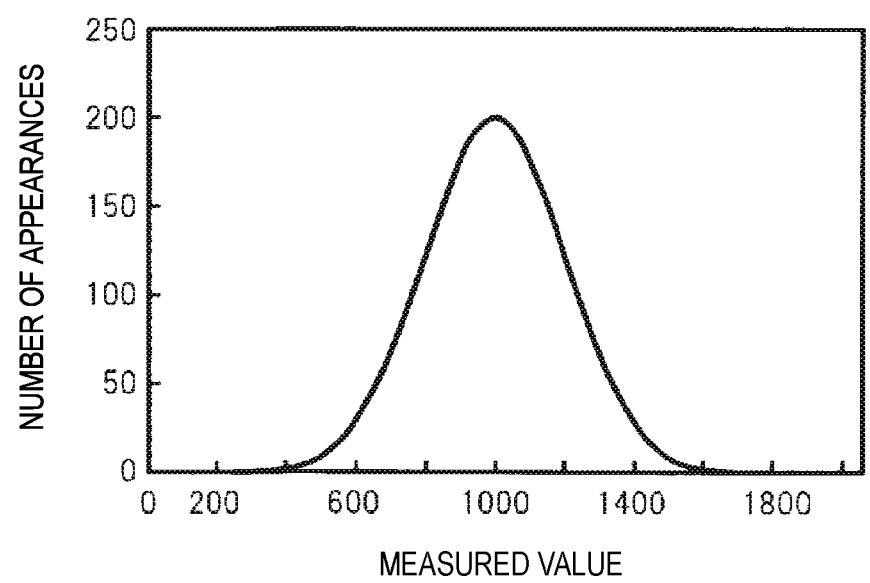

[FIG. 2E]
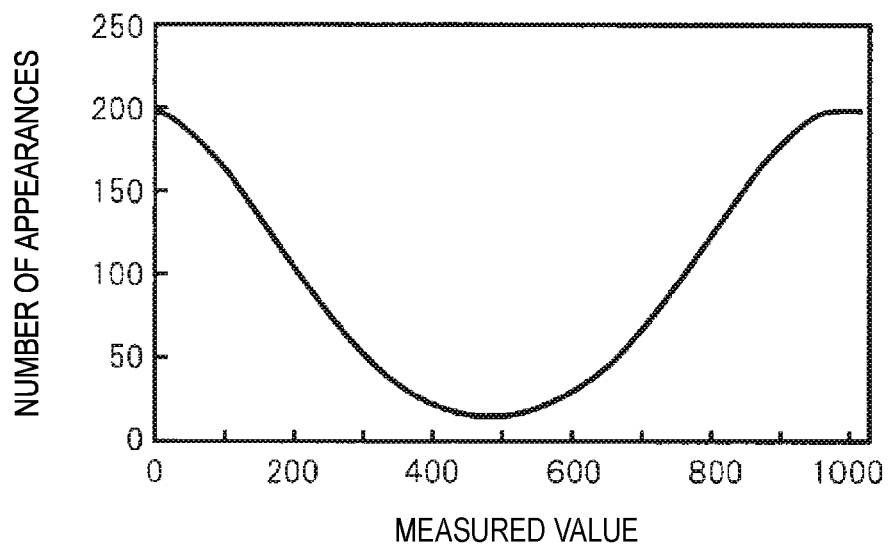
[FIG. 2F]
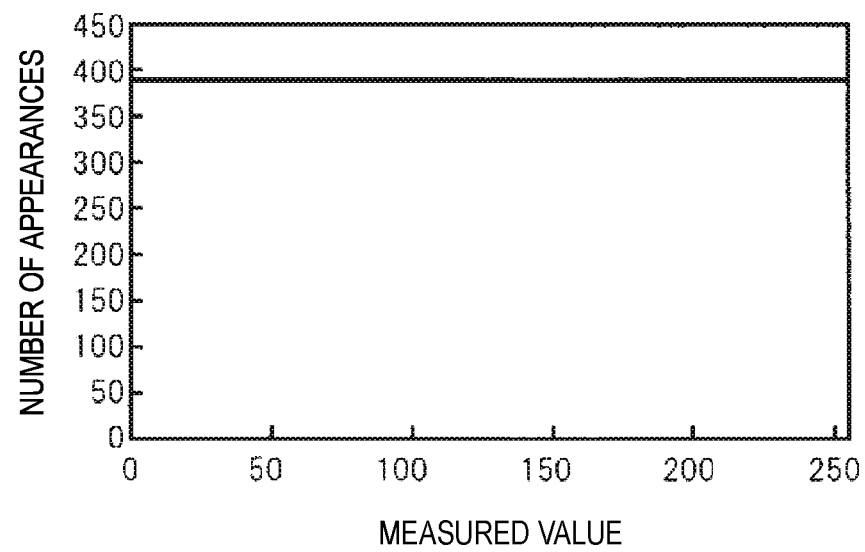

[FIG. 3A]
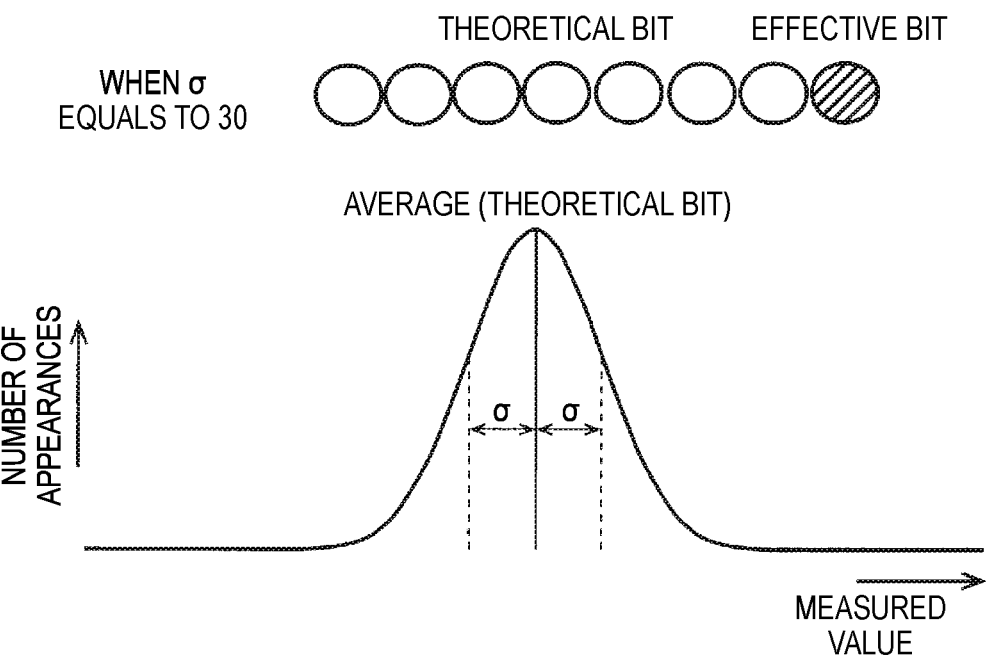
[FIG. 3B]
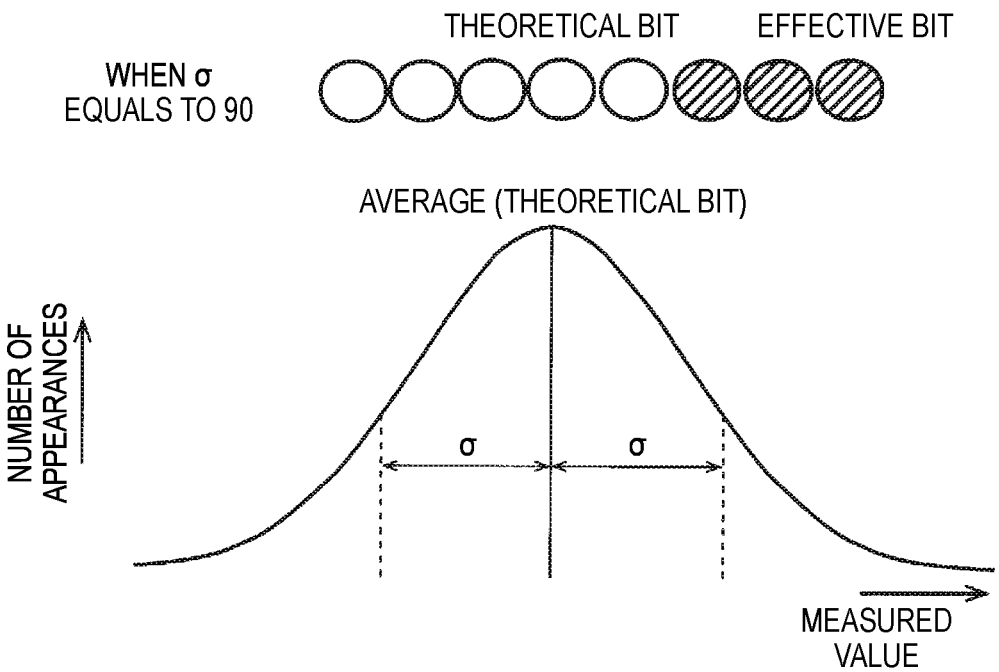

[FIG. 4]
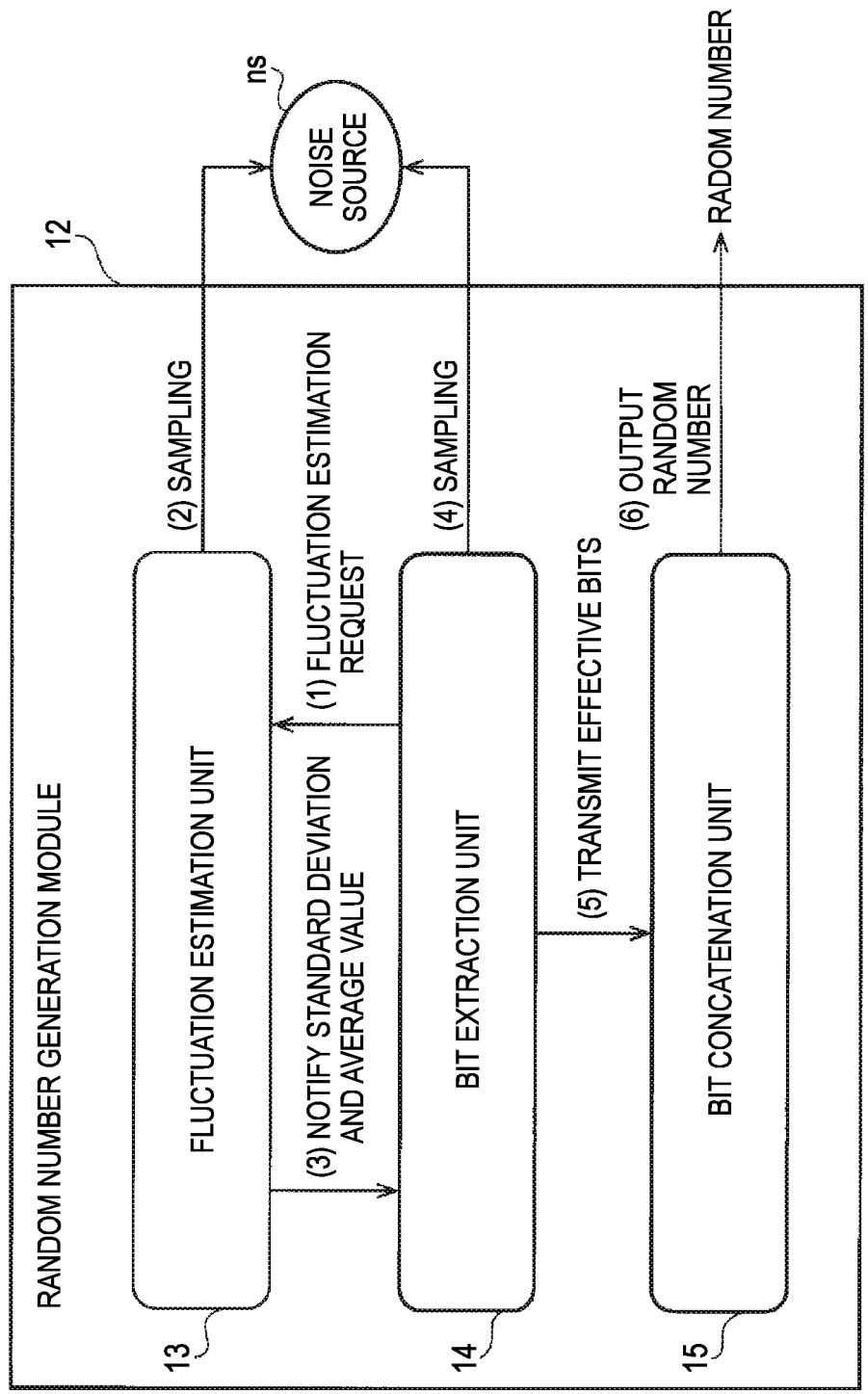

[FIG. 5]

| STANDARD DEVIATION | NUMBER OF EFFECTIVE BITS |
|---|---|
| 1 | 0 |
| ⋮ | 0 |
| 5 | 0 |
| 6 | 1 |
| 7 | 1 |
| 8 | 2 |
| 9 | 2 |
| 10 | 2 |
| 11 | 3 |
| 12 | 3 |
| 13 | 3 |
| ⋮ | ⋮ |

Tb1

[FIG. 6]
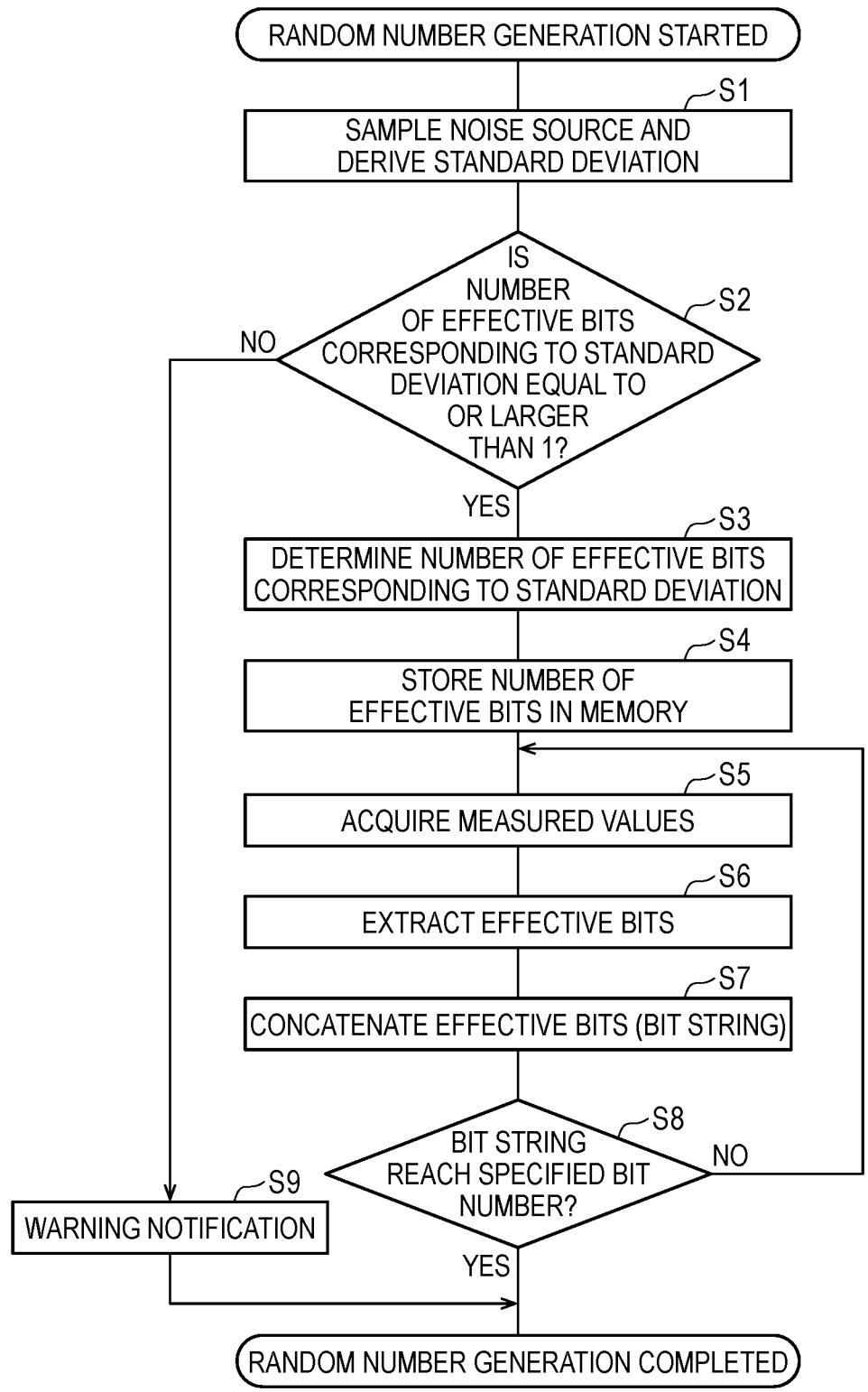

[FIG. 7]
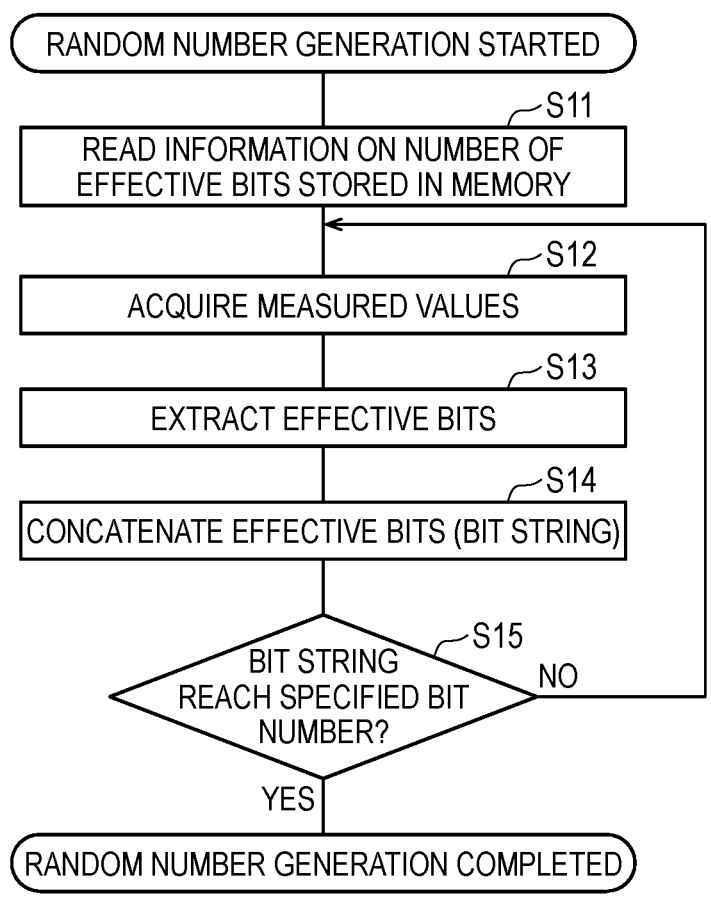

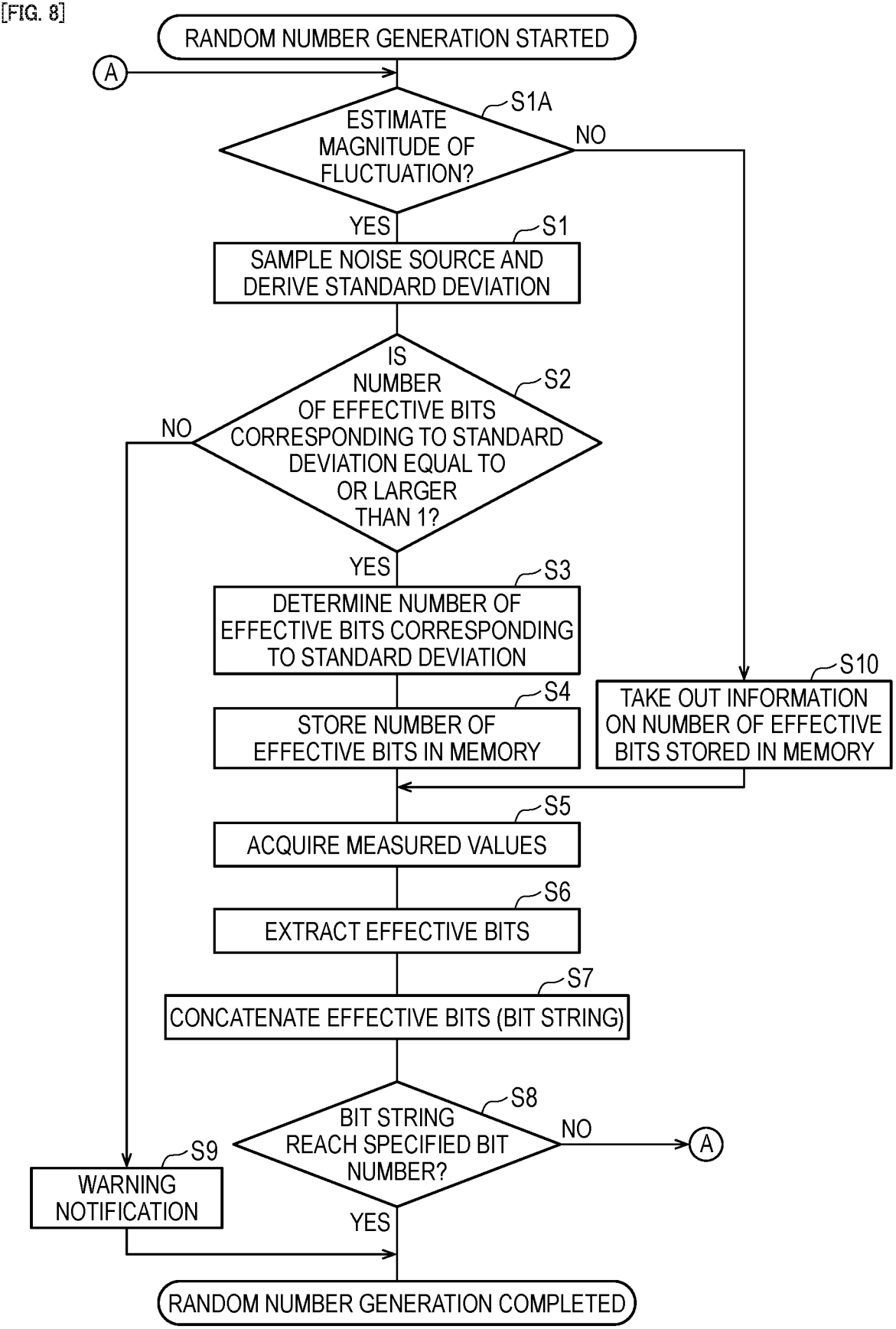

[FIG. 9]
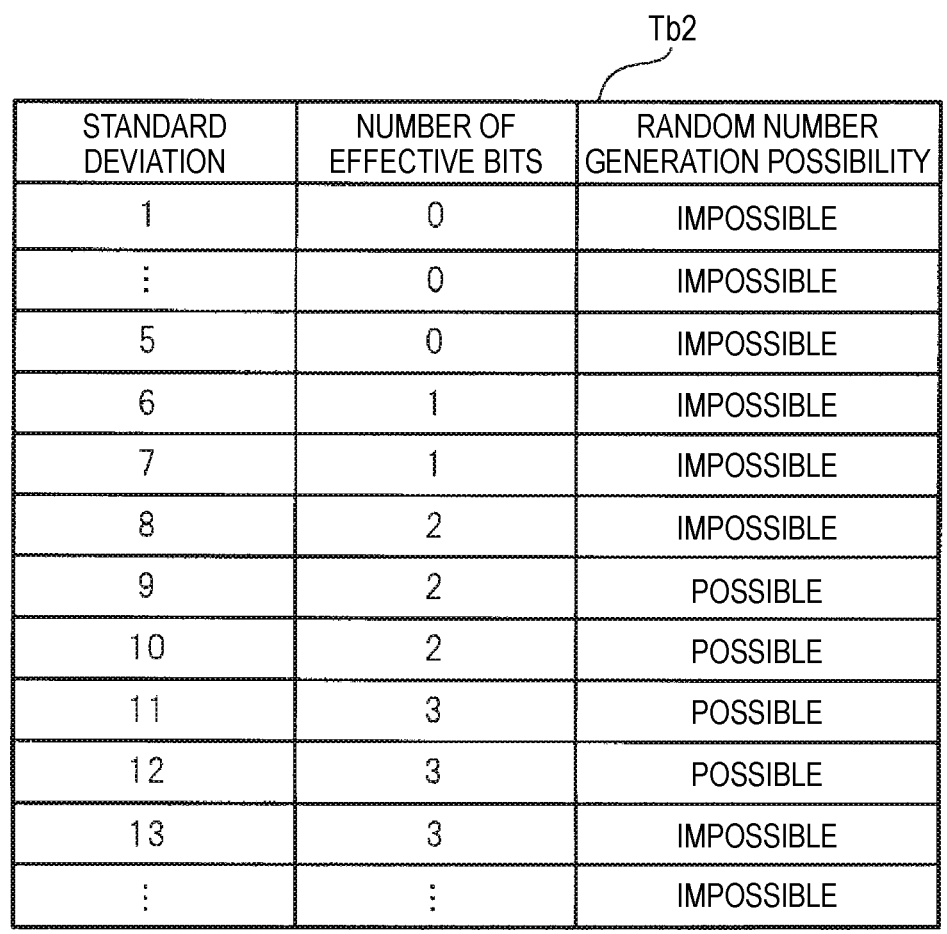

[FIG. 10]
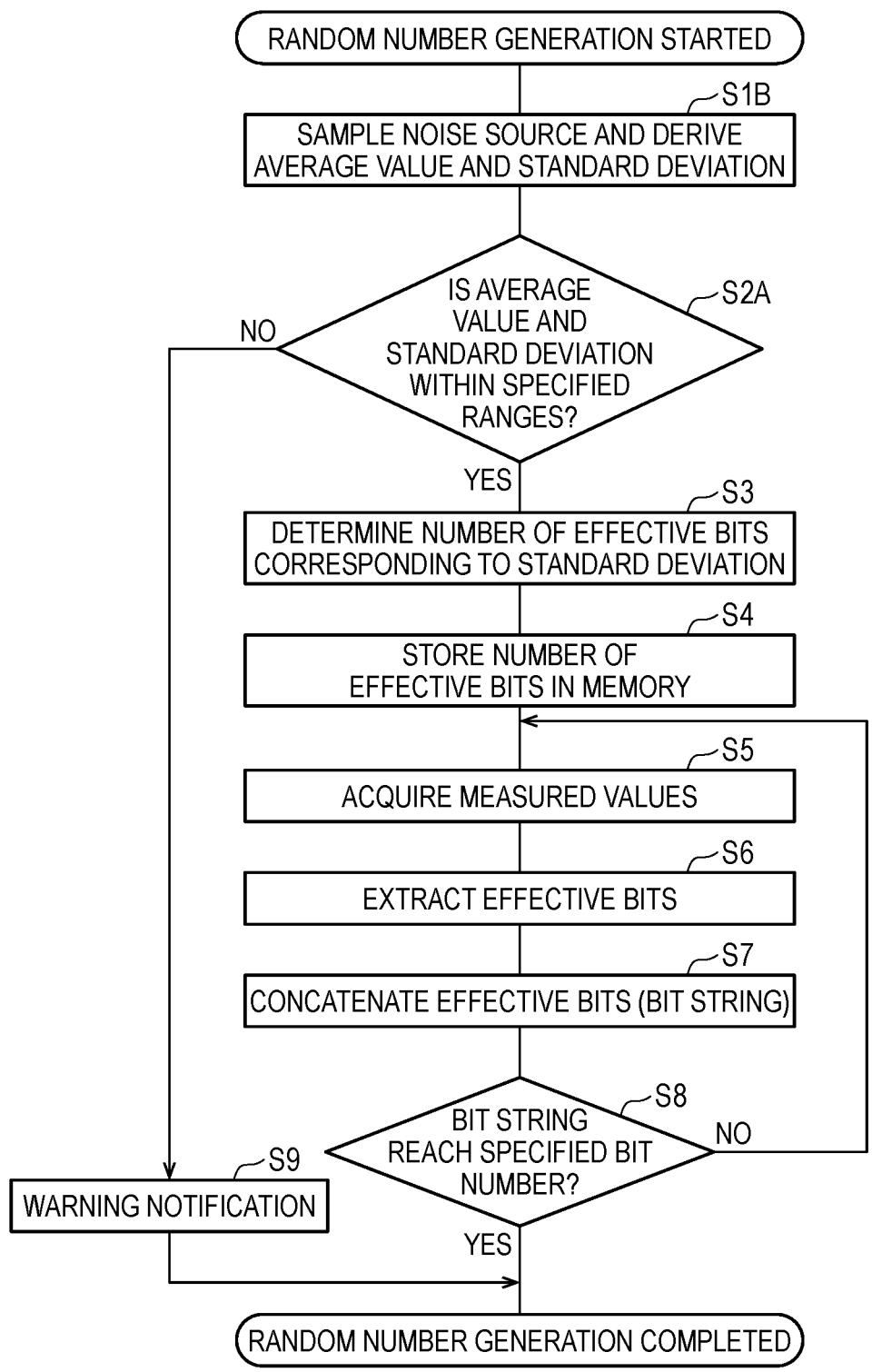

RANDOM NUMBER GENERATION DEVICE, INFORMATION PROCESSING DEVICE, AND RANDOM NUMBER GENERATION METHOD

TECHNICAL FIELD

The present disclosure relates to a random number generation device, an information processing device, and a random number generation method.

BACKGROUND ART

An IoT (Internet of Things) device as an example of an information processing device is also called "Internet of Things", and is a device that has a sensing device and can be connected to a communication network such as the Internet.

The IoT device can communicate data on a sensing result detected by the sensing device with a cloud server on the network via the communication network.

The IoT device transmits the data on the sensing result to the cloud server, receives data on a result analyzed by the cloud server (for example, control data for controlling the IoT device), and drives an actuator included in the IoT device as necessary.

The IoT device is a device connected to the Internet, and there is a concern about security risks, and since the hardware specifications of the IoT devices are inferior to those of a personal computer (PC), it cannot be said that security measures are sufficient. When an IoT device with insufficient security measures is subjected to a cyber-attack, the cyber-attack may be spread over a wide range such as another IoT device or the entire IoT service. For example, a cyber-attack in the automobile field or the medical field may endanger the life or property of the user. Therefore, security measures with the same strength as those of the PC are required for the IoT device.

As a security measure, for example, secure Internet connection can be ensured by secure sockets layer (SSL) of an encryption communication protocol.

The SSL connection requires a secure key (a random number), and the random number can be obtained by giving a seed (SEED) which is a seed of the random number to a pseudo random number generator (PRNG).

In order to obtain a secure random number, it is required that the random number or seed is generated inside the device and is secret information that cannot be known by the designer, and is regularly updated inside the device without reusing it.

However, since an IoT device manufactured with a low-end specification is low in function and low in price, some may have no security measures, and even if security measures are taken, the security strength is low. In the generation of random numbers using a pseudo random number generator, a seed incorporated to the device in advance before shipment may be reused, or a value obtained by combining time and a media access control (MAC) address may be used as a seed.

In order to increase the security strength of the IoT device, there is a method of generating a random number or a seed by incorporating a random number generation circuit configured by special hardware in the IoT device, but the method is not suitable for an IoT device manufactured in a low-end specification.

Here, as a related art having the above-described random number generation circuit, for example, a random number generation device according to Patent Literature 1 has been proposed. In the random number generation device according to the Patent Literature 1, oscillation frequency of an oscillation circuit is set by inputting a selection signal from an external device to a selector, output values from the oscillation circuit is stored, and the output values output from a sampling circuit are arranged according to a sampling clock. Accordingly, the random number generation device can generate a random number with high authenticity.

CITATION LIST

Patent Literature

Patent Literature 1: JP-A-2016-126518

SUMMARY OF INVENTION

Technical Problem

However, in the random number generation device according to Patent Literature 1, when a random number is generated according to a new sampling clock, the external device outputs a selection signal to the oscillation circuit based on an evaluation result of the authenticity of the random number generated according to a previous sampling clock. For this reason, when generating a random number, an external device for outputting a selection signal to the oscillation circuit is necessary in terms of configuration. In other words, the random number generation device according to Patent Literature 1 has a problem that it is difficult to generate a random number unless a selection signal is input from an external device, and the configuration thereof becomes complicated.

The present disclosure is proposed in view of the above situation in the related art, and an object thereof is to provide a random number generation device, an information processing device and a random number generation method with which random numbers matched to the magnitude of fluctuation in measured values obtained at the time of operation are effectively generated using a simple configuration, and cost increase of a device as a whole is prevented.

Solution to Problem

The present disclosure provides a random number generation device including: a first acquisition unit configured to acquire a measured value having bits of M digits, where M being an integer exponent of a power of two; a second acquisition unit configured to acquire, based on the acquired measured value, information on the number of effective bits of N digits used in generating a random number, where N being an integer less than M; and a random number generation unit configured to generate, using the information on the number of effective bits, a random number having effective bits of L digits, where L being a predetermined integer greater than or equal to N.

The present disclosure further provides an information processing device including: a first acquisition unit configured to acquire a measured value having bits of M digits, where M being an integer exponent of a power of two; a second acquisition unit configured to acquire, based on the acquired measured value, information on the number of effective bits of N digits used in generating a random number, where N being an integer less than M; and a random number generation unit configured to generate, using the information on the number of effective bits, a random number having effective bits of L digits, where L being a predetermined integer greater than or equal to N.

The present disclosure further provides a random number generation method using an information processing device, the random number generation method including: a step of acquiring a measured value having bits of M digits, where M being an integer exponent of a power of two; a step of acquiring, based on the acquired measured value, information on the number of effective bits of N digits used in generating a random number, where N being an integer less than M; and a step of generating, using the information on the number of effective bits, a random number having effective bits of L digits, where L being a predetermined integer greater than or equal to N.

Advantageous Effects of Invention

According to the present disclosure, random numbers matched to the magnitude of fluctuation in measured values obtained at the time of operation can be effectively generated using a simple configuration, so that cost increase of a device as a whole can be prevented.

BRIEF DESCRIPTION OF DRAWINGS

FIG. 1 is a block diagram showing an example of an internal configuration of an information processing system including an information processing device according to a first embodiment.

FIG. 2A is a scatter diagram showing an example of a normal distribution.

FIG. 2B is a scatter diagram showing an example of data obtained by extracting lower 8 bits from 11-bit data.

FIG. 2C is a scatter diagram showing an example of data obtained by extracting lower 4 bits from the 11-bit data.

FIG. 2D is a scatter diagram showing an example of another normal distribution.

FIG. 2E is a scatter diagram showing an example of data obtained by extracting lower 10 bits from 11-bit data.

FIG. 2F is a scatter diagram showing an example of data obtained by extracting lower 8 bits from the 11-bit data.

FIG. 3A is a diagram for explaining an effective bit when a standard deviation is small.

FIG. 3B is a diagram for explaining an effective bit when a standard deviation is large.

FIG. 4 is a diagram showing an example of an operation outline of a random number generation module.

FIG. 5 is a table showing a correspondence table between a standard deviation and the number of effective bits.

FIG. 6 is a flowchart showing in detail an example of a random number generation operation procedure in the information processing device according to the first embodiment.

FIG. 7 is a flowchart showing in detail an example of a random number generation operation procedure in the information processing device according to a modification of the first embodiment.

FIG. 8 is a flowchart showing in detail an example of a random number generation operation procedure in the information processing device according to a second embodiment.

FIG. 9 is a table showing an example of a correspondence table among standard deviation, the number of effective bits, and random number generation possibility in the information processing device according to a third embodiment.

FIG. 10 is a flowchart showing in detail an example of a random number generation operation procedure in the information processing device according to the third embodiment.

DESCRIPTION OF EMBODIMENTS

Hereinafter, embodiments specifically disclosing a random number generation device, an information processing device and a random number generation method according to the present disclosure will be described in detail with reference to the drawings as needed. However, detailed descriptions more than necessary may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

First Embodiment

FIG. 1 is a block diagram showing an example of an internal configuration of an information processing system 5 including an information processing device 10 according to a first embodiment.

The information processing system 5 includes a plurality of information processing devices 10 and 80, an administrator terminal 40, a PC 50, and a smartphone 60. The plurality of information processing devices 10 and 80, the administrator terminal 40, the PC 50, and the smartphone 60 are connected to each other via the Internet 70. Since details of the internal configuration of the information processing devices 10 and 80 are the same, the information processing device 10 is representatively exemplified in the description of the internal configuration and operation.

The information processing device 10 is an Internet of things (IoT) device, for example. As described above, the IoT device is, for example, an electronic device with a low-end specification that includes a sensing device and can be connected to a communication network such as the Internet. The IoT device can communicate data on a sensing result detected by the sensing device with a cloud server via the communication network, and drive an actuator built therein according to control data transmitted from the cloud server. Examples of the IoT device include a monitoring camera, a payment terminal, a body camera, a door phone, a multifunction device, a smart meter, a programmable logic controller (PLC), and a gateway box. In other words, the information processing devices 10 and 80 may be, for example, any one of the monitoring camera, the payment terminal, the body camera, the door phone, the multifunction device, the smart meter, the PLC, and the gateway box described above. Here, the information processing device 10 is an electronic device with a low-end specification that does not have an advanced information processing function, but it may also be an electronic device with a high-end specification such as a personal computer (PC), a mobile phone, or a smartphone having an advanced information processing function.

The information processing device 10 includes a CPU 11, a ROM 16, a RAM 17, a flash memory 18, a hard disk drive (HDD) 19, a communication interface (I/F) circuit 20, an input I/F circuit 21, and an output I/F circuit 22. The CPU 11, the ROM 16, the RAM 17, the flash memory 18, the hard disk drive (HDD) 19, the communication interface (I/F) circuit 20, the input I/F circuit 21, and the output I/F circuit 22 are connected via a bus 28.

The communication I/F circuit 20 controls connection with the Internet 70. In the information processing system 5 shown in FIG. 1, the communication network that connects the information processing devices 10 and 80, the administrator terminal 40, the PC 50 and the smartphone 60 is not limited to the Internet 70 using a public network, and may be a dedicated network such as an intranet used in a store, a company, or the like.

For example, an input device 31 such as a microphone or a sensor is connected to the input I/F circuit 21.

An output device 32 such as a speaker, a display or the like is connected to the output I/F circuit 22.

The information processing device 10 includes a high speed oscillator 23, a low speed oscillator 24, and a clock counter 25.

The CPU 11 incorporates a random number generation module 12 for generating a random number as a so-called software module. That is, the CPU 11 can implement the random number generation module 12 as a software module by reading and executing a program and data stored in advance in the ROM 16.

The random number generation module 12 as an example of the random number generation device includes a fluctuation estimation unit 13, a bit extraction unit 14, and a bit concatenation unit 15 as software function units. An operation of the fluctuation estimation unit 13, the bit extraction unit 14, and the bit concatenation unit 15 will be described later with reference to FIG. 4.

The ROM 16 stores in advance, for example, a program and data necessary for the information processing device 10 to operate as an IoT device, and further a program and data that enable the CPU 11 to implement the random number generation module 12 as a software module.

The RAM 17 is used as a working memory for each unit (for example, CPU 11) of the information processing device 10, and temporarily stores data that is referred to when each unit of the information processing device 10 operates.

The flash memory 18 stores data generated by the information processing device 10 (for example, data generated by the random number generation module 12 and indicating the magnitude of fluctuation of a plurality of measured values (see below)) and the like.

The HDD 19 is a storage capable of storing a large amount of data generated by the information processing device 10.

The high speed oscillator 23 generates a high frequency clock signal necessary for the operation of the CPU 11 and outputs the high frequency clock signal to the CPU 11.

The low speed oscillator 24 generates a low frequency clock signal, as compared with that of the high speed oscillator 23, necessary for the operation of the CPU 11 and outputs the low frequency clock signal to the CPU 11.

The high speed oscillator 23 and the low speed oscillator 24 are used as a supply source (that is, a noise source) of a plurality of measured values in the information processing device 10 together with the clock counter 25.

The clock counter 25 counts clock signals output from the high speed oscillator 23 within one clock period of a clock signal output from the low speed oscillator 24, and outputs a clock counter value as an example of a measured value to the CPU 11.

As described above, the information processing device 80 is an IoT device having a configuration the same as that of the information processing device 10. In the present specification, the configuration and operation of the information processing device 80 includes the configuration and operation the same as those of the information processing device 10. The information processing device 80 may have a configuration different from that of the information processing device 10.

The administrator terminal 40 is a personal computer (PC) operated by an administrator of the information processing system 5. For example, when a notification such as a result report for random number generation is transmitted from the information processing devices 10 and 80, the administrator terminal 40 receives the notification and displays the notification on a display (not shown) for the administrator to view.

The PC 50 transmits and receives data to and from the information processing devices 10 and 80. The PC 50 is possessed by, for example, the administrator or a user of the information processing system 5, and similarly to the administrator terminal 40, for example, when a notification such as a result report for random number generation is transmitted from the information processing devices 10 and 80, the PC 50 receives the notification and displays the notification on a display (not shown) of the PC 50.

The smartphone 60 is possessed by, for example, the administrator or the user of the information processing system 5, and similarly to the administrator terminal 40, for example, when a notification such as a result report for random number generation is transmitted from the information processing devices 10 and 80, the smartphone 60 receives the notification and displays the notification on a display (not shown) of the smartphone 60.

Next, random number generation operation in the information processing device 10 described above will be described in detail.

First, an outline of the random number generation operation in the information processing device 10 according to the present embodiment will be described. In the present embodiment, the information processing device 10 uses data of a fluctuation part in a normal distribution as an example of a characteristic of measured values that can be acquired at the time of operation of the information processing device 10 so as to generate a random number.

FIG. 2A is a scatter diagram showing an example of a normal distribution.

The normal distribution shown in FIG. 2A is a scatter diagram obtained by simulation in which a standard deviation as an example of the magnitude of fluctuation in measured values is relatively small. In FIGS. 2A to 2F, the horizontal axis represents the measured values, and the vertical axis represents the number of appearances. A range of measured values is from 0 to 2000. The average value is 1000. Here, the standard deviation as an example of the magnitude of fluctuation in the measured values is 100. The values of 0 to 2000 which is the range of measured values are represented by 11 bits (that is, eleventh power of two which is a power of two), for example. That is, each measured value acquired by the information processing device 10 is represented by 11-bit data.

FIG. 2B is a scatter diagram showing an example of data obtained by extracting lower 8 bits from the 11-bit data.

In the scatter diagram shown in FIG. 2B, as a result of executing a process of masking (that is, removing) bits other than the lower 8 bits of the 11-bit data, the number of appearances for only data on the lower 8 bits is shown. As shown in FIG. 2B, the number of appearances for the data on the lower 8 bits slightly decreases in the range of values from 100 to 150 and increases in ranges on both sides thereof. That is, it can be seen that even when only the lower 8 bits are extracted, the number of appearances for measured values of the lower 8 bits is not uniform. In other words, it can be seen that since the number of appearances is not uniform, the appearance may be biased toward a specific value, and lack of suitability as a random number.

FIG. 2C is a scatter diagram showing an example of data obtained by extracting lower 4 bits from the 11-bit data.

In the scatter diagram shown in FIG. 2C, as a result of executing a process of masking (that is, removing) bits other than the lower 4 bits of the 11-bit data, the number of appearances for only data on the lower 4 bits is shown. As shown in FIG. 2C, the number of appearances for data on the lower 4 bits is the same (that is, equal) in the range of values from 0 to 15. That is, it can be seen that when only the lower 4 bits are extracted, the number of appearances for measured values of the lower 4 bits is uniform. Therefore, since it does not appear biased to a specific value, it can be determined that the data on the lower 4 bits has suitability for random number generation.

FIG. 2D is a scatter diagram showing an example of another normal distribution.

Compared with the normal distribution shown in FIG. 2A, the normal distribution shown in FIG. 2D is a scatter diagram obtained by simulation in which a standard deviation as an example of the magnitude of fluctuation in the measured values is relatively large. A range of measured values is from 0 to 2000. The average value is 1000. Here, the standard deviation as an example of the magnitude of fluctuation in the measured values is 200. Similar to that of FIG. 2A, the values of 0 to 2000 which is the range of measured values are represented by 11 bits (that is, eleventh power of two which is a power of two), for example.

FIG. 2E is a scatter diagram showing data obtained by extracting lower 10 bits from 11-bit data.

In the scatter diagram shown in FIG. 2E, as a result of executing a process of masking (that is, removing) bits other than the lower 10 bits of the 11-bit data, the number of appearances for only data on the lower 10 bits is shown. As shown in FIG. 2E, the number of appearances for the data on the lower 10 bits greatly decreases in the range of values from 400 to 600, and gradually increases on both sides thereof. That is, it can be seen that even when only the lower 10 bits are extracted, the number of appearances for measured values of the lower 10 bits is clearly not uniform. In other words, it can be seen that since the number of appearances is clearly not uniform, the appearance may be biased toward a specific value, and lack of suitability as a random number.

FIG. 2F is a scatter diagram showing data obtained by extracting lower 8 bits from the 11-bit data.

In the scatter diagram shown in FIG. 2F, as a result of executing a process of masking (that is, removing) bits other than the lower 8 bits of the 11-bit data, the number of appearances for only data on the lower 8 bits is shown. As shown in FIG. 2F, the number of appearances for data on the lower 8 bits is the same (that is, equal) in the range of values from 0 to 255. That is, it can be seen that when only the lower 8 bits are extracted, the number of appearances for measured values of the lower 8 bits is uniform. Therefore, since it does not appear biased to a specific value, it can be determined that the data on the lower 8 bits has suitability for random number generation.

As described above, as compared with the normal distribution shown in FIG. 2A, in the normal distribution shown in FIG. 2D, data that can be used to generate a random number is obtained with 4 more bits. That is, when a random number is generated using data of the fluctuation part of the normal distribution, the number of bits that can be used for generating a random number (effective bit) differs depending on the standard deviation as an example of the magnitude of fluctuation in the measured values. In other words, the information processing devices 10 and 80 can determine the effective bit that can be used for generating a random number by obtaining the standard deviation of the measured values.

Next, determination of a bit number of the effective bits (hereinafter, also referred to as "the number of effective bits") configuring random numbers to be generated by the information processing devices 10 and 80 will be described.

In the information processing devices 10 and 80 according to each of embodiments including the present embodiment, data on the measured values collected from the noise source (that is, a source that generates the measured values acquired by the information processing devices 10 and 80 (supply source)) by sampling includes a theoretical bit in an upper digit of the measured values and an effective bit in a lower digit of the measured value, and has bits of M digits, where M is an integer exponent of a power of two when expressed in binary. The theoretical bit is a value close to a theoretical value of the measured values, and is a bit string or a bit that cannot be used for generating a random number because an appearance pattern of the bit is almost constant, and lacks the suitability for generating the random number. The effective bit is a value of N (where N is an integer value less than M) digits, is a value close to an error in the measured values caused by the fluctuation in the noise source, and is a bit string or a bit that can be used for generating a random number because an appearance pattern of the bit is random, and has the suitability for generating the random number. For example, in a case where a measured value is represented by "246" in decimal notation and by a bit string of 8 digits "11110110" in binary notation, a bit string of upper 6 digits (that is, "111101") can be determined as the theoretical bit, and a bit string of lower 2 digits (that is, "10") can be determined as the effective bit.

In the present embodiment, the information processing devices 10 and 80 estimate (in other words, derive) the magnitude of fluctuation in the measured values acquired from the noise source (for example, the standard deviation of the measured values), and determine the number of effective bits based on the magnitude of fluctuation. The information processing devices 10 and 80 can estimate the magnitude of fluctuation using the standard deviation of the normal distribution described above. In addition, a value obtained by concatenating (connecting) values of the effective bits determined by the information processing devices 10 and 80 can be used as a random number as a value having a uniform and same number of appearances.

FIG. 3A is a diagram for explaining an example of an effective bit when the standard deviation is small.

As shown in FIGS. 2A to 2F, FIGS. 3A and 3B also show a relationship between the measured value and the number of appearances thereof. In FIG. 3A, when the standard deviation $\sigma$ is small (for example, $\sigma=30$), among measured values represented by an 8-bit width, the upper 7 bits are the theoretical bits and the lower 1 bit is the effective bit. That is, when the information processing devices 10 and 80 generate a random number, only the lower 1 bit of the measured value can be used as the effective bit configuring the random number.

FIG. 3B is a diagram for explaining an example of an effective bit when the standard deviation is large.

In FIG. 3B, when the standard deviation a is large (for example, σ=90), among measured values represented by an 8-bit width, the upper 5 bits are the theoretical bits and the lower 3 bits are the effective bits. That is, when the information processing devices 10 and 80 generate a random number, the lower 3 bits of the measured value can be used as the effective bits configuring the random number. As described above, the information processing devices 10 and 80 can variably determine the bit number of effective bits (the number of effective bits) for forming a random number according to the magnitude of fluctuation (for example, standard deviation) in the measured values, and the number of effective bits extracted from the measured values increases as the standard deviation increases, so that the random number itself or a value that is the source of the random number (seed value) can be generated with a small number of samplings.

FIG. 4 is a diagram showing an example of an operation outline of the random number generation module 12.

As described above, the random number generation module 12 is a software module executed by the CPU 11. Specifically, the fluctuation estimation unit 13, the bit extraction unit 14, and the bit concatenation unit 15 are implemented as software functions executed by the CPU 11.

When the fluctuation estimation unit 13 as an example of a first acquisition unit is requested to estimate the fluctuation from the bit extraction unit 14 (see (1) in the figure), the fluctuation estimation unit 13 starts sampling (that is, collecting and acquiring a plurality of measured values) the noise source ns (see (2) in the figure), acquires the measured values by the sampling, and stores the measured values in a memory (for example, the RAM 17 or the flash memory 18). The fluctuation estimation unit 13 separately calculates an average value, a variance, and a standard deviation of the measured values at a timing when the measured values for the number of samples necessary for estimating (in other words, deriving) the magnitude of fluctuation (for example, standard deviation) in the measured values are stored in the memory, and notifies the bit extraction unit 14 of the standard deviation and the average value of the measured values as an estimation result (see (3) in the figure).

Here, the procedure in which the fluctuation estimation unit 13 calculates the standard deviation of the measured values for the number of samples acquired by the sampling will be described.

Step 1: The fluctuation estimation unit 13 obtains the measured values for the number of samples necessary for calculating a standard deviation from the noise source ns, and prepares an array for storing the measured values separately. The number of samples can be calculated by the fluctuation estimation unit 13 based on a known method, for example. For example, the number of samples necessary for calculating the standard deviation can be calculated by specifying the error, reliability, and assumed standard deviation by estimating an interval of the population of measured values.

Step 2: The fluctuation estimation unit 13 stores the measured values for the number of samples acquired from the noise source ns in the array prepared in Step 1.

Step 3: The fluctuation estimation unit 13 calculates a total value of the measured values by adding the measured values for the number of samples stored in the respective arrays in the Step 2.

Step 4: The fluctuation estimation unit 13 calculates an average value of the measured values by dividing the total value calculated in Step 3 by the number of samples.

Step 5: The fluctuation estimation unit 13 uses the total value calculated in Step 3 and the average value calculated in Step 4 to calculate a variance in the measured values for the number of samples acquired in Step 1.

Step 6: The fluctuation estimation unit 13 calculates the standard deviation of the measured values by calculating a square root of the variance calculated in Step 5.

The noise source ns is, for example, the low speed oscillator 24, and the count value obtained by the clock counter 25 counting the clock output from the high speed oscillator 23 within one clock period of the low speed oscillator 24 can be used as a measured value. There may be one or a plurality of noise sources ns to be sampled. When there are a plurality of noise sources ns, the fluctuation estimation unit 13 estimates the magnitude of fluctuation (for example, standard deviation) in the measured values acquired from the respective noise sources ns, and notifies the bit extraction unit 14 of the standard deviation and the average value of the measured values.

The measured values from the noise source ns may be generated in the information processing devices 10 and 80 or may be input from an external device. In addition to the count value of the clock counter 25 described above, examples of the measured values from the noise source ns further include an arrival time (delta time) of a packet transmitted to and received from a communication device via the network, and a delay time of a packet transmitted using a user datagram protocol (TCP) or a transmission control protocol/Internet protocol (TCP/IP). The examples of the measured values from the noise source ns further include a writing time and a reading time that the CPU 11 performs on a storage medium such as the flash memory 17 and the HDD 18. Further, an error of an A/D conversion value by an AD converter (not shown) built in the CPU 11 of the information processing devices 10 and 80, and an error of a D/A conversion value by a DA converter (not shown) built in the CPU 11 can be exemplified.

The fluctuation estimation unit 13 samples the noise source ns at the timing of the fluctuation estimation request from the bit extraction unit 14, and estimates (in other words, derives) the magnitude of fluctuation (for example, the standard deviation) in the measured values obtained from the noise source ns. The fluctuation estimation unit 13 constantly samples the noise source ns, and updates data on the standard deviation and average value of the measured values stored in the memory (for example, the flash memory 18), so that when receiving the fluctuation estimation request form the bit extraction unit 14, the fluctuation estimation unit 13 may notify the bit extraction unit 14 of the data on the standard deviation and average value of the measured values stored in the memory (for example, the flash memory 18).

The bit extraction unit 14 requests the fluctuation estimation unit 13 to estimate fluctuation, and receives the standard deviation that is the magnitude of fluctuation of the noise source ns, and the average value of the measured values. The bit extraction unit 14, as an example of a second acquisition unit, determines the number of effective bits based on the received standard deviation by using a correspondence table (table) between a standard deviation registered in advance and the number of effective bits, and acquires information regarding the number of effective bits of N digits used for generating a random number.

FIG. 5 is a table showing a correspondence table Tb1 between a standard deviation and the number of effective bits.

In FIG. 5, for easy understanding, standard deviations are schematically and intentionally arranged as small numbers, and the same applies to FIG. 9 below. This correspondence table Tb1 shows an example of the number of effective bits corresponding to the standard deviation. Specifically, in the correspondence table Tb1, when the standard deviation is 1 to 5, the information processing devices 10 and 80 registers information for determining the number of effective bits as 0. In this case, the information processing devices 10 and 80 cannot extract an effective bit (that is, a random number or a seed cannot be generated). In the correspondence table Tb1, when the standard deviation is 6 or 7, the information processing devices 10 and 80 registers information for determining the number of effective bits as 1; when the standard deviation is 8 to 10, the information processing devices 10 and 80 registers information for determining the number of effective bits as 2; and when the standard deviation is 11 to 13, the information processing devices 10 and 80 registers information for determining the number of effective bits as 3.

The bit extraction unit 14 may send the fluctuation estimation request to the fluctuation estimation unit 13 every time of generating a random number. Further, the bit extraction unit 14 may also store, in a memory (for example, the flash memory 18), the number of effective bits determined in advance by estimating the magnitude of fluctuation, and when generating a random number, use the number of effective bits stored in the memory (for example, the flash memory 18) without requesting the fluctuation estimation unit 13 to perform the fluctuation estimation. The memory used at this time may be either a volatile memory or a nonvolatile memory.

Once the number of effective bits is determined, the bit extraction unit 14 starts sampling the noise source (see (4) in the figure), extracts effective bits corresponding to the determined number of effective bits for each measured value obtained by the sampling, and transmits the effective bits to the bit concatenation unit 15 (see (5) in the figure). The sampling of the noise source ns is repeated until a sum of the effective bits extracted from the measured values reaches a digit number of the specified bit of L digits, where L is a predetermined integer value greater than or equal to N. The value L indicating the digit number of the specified bit may be the same as a value M indicating a digit number of the measured value, or may be larger than the value M indicating the digit number of the measured value.

The bit concatenation unit 15, as an example of a random number generation unit, concatenates (connects) the effective bits received from the bit extraction unit 14 in order from the lowest order of the bit string to the specified bit number. When the sum of the bit strings reaches the specified bit number (that is, the digit number of the random number), the bit concatenation unit 15 outputs the random number including the specified bit string (see (6) in the figure). The concatenation of effective bits may be performed in order from the lowest order, and may also be performed in order from the highest order, or may be performed from any bit position in the bit string.

FIG. 6 is a flowchart showing in detail an example of a random number generation operation procedure in the information processing devices 10 and 80 according to the first embodiment.

With reference to FIG. 6, the random number generation operation procedure will be described by exemplifying the information processing device 10, but the same applies to the information processing device 80 and the same in the following embodiments.

In FIG. 6, the CPU 11 or the random number generation module 12 of the information processing device 10 starts the random number generation operation at a predetermined timing. Examples of the predetermined timing include, for example, a case where a time point measured by the CPU 11 reaches a predetermined time point, a case where a random number is required to generate a key in the SSL negotiation when starting SSL communication, or a case where a subject (for example, a person) is detected by a sensing device (not shown) included in the information processing device 10. The predetermined timing is not limited to these cases, and the same applies to the following embodiments.

When the random number generation operation is started, the bit extraction unit 14 requests the fluctuation estimation unit 13 to perform fluctuation estimation. Once receiving the fluctuation estimation request from the bit extraction unit 14, the fluctuation estimation unit 13 samples the noise source ns to acquire a plurality of measured values, and derives an average value and a standard deviation according to the steps 1 to 6 described above using the plurality of acquired measured values (S1). The fluctuation estimation unit 13 transmits the average value and the standard deviation to the bit extraction unit 14 as a result of the fluctuation estimation. The bit extraction unit 14 determines whether a value of the number of effective bits corresponding to the standard deviation equal to or larger than 1 (S2). In a case where the value of the number of effective bits is equal to or larger than 1 (YES in S2), the bit extraction unit 14 determines the number of effective bits corresponding to the standard deviation (S3). The bit extraction unit 14 stores information on the determined number of effective bits in a memory (for example, RAM 17, flash memory 18) (S4).

The bit extraction unit 14 samples the noise source ns to acquire measured values (S5). The bit extraction unit 14 extracts effective bits for the number of effective bits from the acquired measured values based on the information on the number of effective bits determined in step S3. The bit extraction unit 14 transmits data on the extracted effective bits for the number of effective bits to the bit concatenation unit 15 (S6). The bit concatenation unit 15 concatenates the data on the effective bits received from the bit extraction unit 14 in order from the lowest order of the bit string (S7).

The bit concatenation unit 15 determines whether the bit string configured with the effective bits reaches a specified bit number corresponding to the digit number of the random number or the seed value (S8). In a case where the bit string configured with the effective bits does not reach the specified bit number (NO in S8), the processing of the CPU 11 or the random number generation module 12 returns to step S5. On the other hand, in a case where the bit string configured with the effective bits reaches the specified bit number (YES in S8), the processing of the CPU 11 or the random number generation module 12 ends as shown in FIG. 6.

Further, in a case where the value of the number of effective bits corresponding to the standard deviation is 0 in step S2 (NO in S2), the bit extraction unit 14 instructs the communication I/F circuit 20 to notify a warning or abnormality to at least one of the administrator terminal 40 and the smartphone 60, which are external devices (S9). Accordingly, the information processing device 10 notifies a warning or abnormality to at least one of the administrator terminal 40 and the smartphone 60, which are external devices. Thereafter, the processing of the CPU 11 or the random number generation module 12 ends as shown in FIG. 6.

As described above, in the information processing device 10 or the random number generation module 12 according to the first embodiment, the fluctuation estimation unit 13 acquires, from the noise source ns, a plurality of measured values having the bits of M digits, where M is an integer exponent of a power of two. The bit extraction unit 14 acquires information on the number of effective bits of N (N being an integer value equal to or less than M) digits used for generating a random number based on the plurality of acquired measured values. The bit concatenation unit 15 generates the random number having data configured with the effective bits of L (a predetermined integer value greater than or equal to N) digits using the information on the number of effective bits.

Therefore, in the random number generation module 12 which is an example of the random number generation device and the information processing device 10, the random number matched to the magnitude of fluctuation in measured values obtained at the time of operation can be effectively generated with a simple configuration by using the measured values for the number of effective bits having a uniform appearance frequency. Further, cost increase of a device as a whole can be prevented since the random number generation module 12 which is an example of the random number generation device and the information processing device 10 can be configured using an electronic device with a low-end specification (for example, IoT device) in which special hardware such as a random number generation module is not incorporated.

The bit extraction unit 14 derives the number of effective bits (information on the effective bits) based on the standard deviation of a certain number of measured values (that is, magnitude of fluctuation in the appearance frequency of the measured values). In this way, the random number generation module 12 or the information processing device 10 determines the number of effective bits used for generating a random number based on the standard deviation obtained from a plurality of measured values acquired by sampling for a certain period, so that an appropriate random number configured with effective bits corresponding to the obtained number of effective bits with a uniform appearance frequency can be generated by using an appropriate fluctuation in the appearance frequency of the measured values appearing in the normal distribution.

The bit extraction unit 14 derives the information on the number of effective bits corresponding to the magnitude of fluctuation (for example, standard deviation) in the measured values by using the correspondence table Tb1 (table) in which the magnitude of fluctuation (for example, standard deviation) in the measured values is associated with the number of effective bits. As described above, the random number generation module 12 or the information processing device 10 can easily derive the number of effective bits corresponding to the standard deviation without causing a large load on the information processing device 10 by using the correspondence table Tb1.

In addition, when information on the number of effective bits cannot be derived, the bit extraction unit 14 which is an example of a notification unit or the information processing device 10 notifies a warning or abnormality to the administrator terminal 40 or the smartphone 60 (that is, output a warning or abnormality to an external device). Therefore, the administrator or the user can immediately know that the number of effective bits cannot be derived and that the information processing device 10 having the function of the random number generation module 12 is somehow abnormal.

Modification of First Embodiment

In the first embodiment, the magnitude of fluctuation (for example, standard deviation) in the measured values is estimated every time the random number generation operation is started. The modification of the first embodiment shows a case where the number of effective bits corresponding to the standard deviation is already determined by the bit extraction unit 14 of the random number generation module 12, and the number of effective bits is registered in the memory (for example, RAM 17, flash memory 18) in advance.

Here, the device that determines the number of effective bits in advance is the information processing device 10 in which the number of effective bits is registered. The information processing device 10 in which the number of effective bits is registered may determine the number of effective bits by an external device (for example, the information processing device 80 or the administrator terminal 40 shown in FIG. 1), and receive information on the number of effective bits input from the external device and register the information in the memory (for example, RAM 17, flash memory 18). The information processing device 10 may also receive the information on the number of effective bits by a user input operation and register the information in the memory (for example, RAM 17, flash memory 18).

Since the hardware configuration of the information processing device 10 according to the present modification is the same as the hardware configuration of the information processing device 10 according to the first embodiment, the same components as those in the first embodiment are denoted by the same reference numerals, and the description thereof is simplified or omitted. In a case where the information processing device 10 receives information on the number of effective bits by an input from an external device or a user input operation, the configuration of the fluctuation estimation unit 13 in the random number generation module 12 can be omitted.

FIG. 7 is a flowchart showing in detail an example of a random number generation operation procedure in the information processing device 10 according to a modification of the first embodiment.

In FIG. 7, the CPU 11 or the random number generation module 12 of the information processing device 10 starts the random number generation operation at a predetermined timing. Since the specific example of the predetermined timing has been described in the first embodiment, the description thereof is omitted here.

The bit extraction unit 14 reads and acquires information on the number of effective bits having a value of 1 or more, which is stored in advance in the memory (for example, RAM 17, flash memory 18) (S11). The memory is preferably a non-volatile memory that is not erased even when the power is turned off, but may also be a volatile memory.

The bit extraction unit 14 samples the noise source ns to acquire measured values (S12). The bit extraction unit 14 extracts the effective bits corresponding to the digit number of the number of effective bits from the acquired measured values based on the information on the number of effective bits acquired in step S11. The bit extraction unit 14 transmits data on the extracted effective bits for the number of effective bits to the bit concatenation unit 15 (S13). The bit concatenation unit 15 concatenates the data on the effective bits received from the bit extraction unit 14 in order from the lowest order of the bit string configured with the effective bits (S14). The concatenation of effective bits may be performed in order from the lowest order, and may also be performed in order from the highest order, or may be performed from any bit position in the bit string.

The bit concatenation unit 15 determines whether the bit string configured with the effective bits reaches a specified bit number corresponding to the digit number of the random number or the seed value (S15). In a case where the bit string configured with the effective bits does not reach the specified bit number (NO in S15), the processing of the CPU 11 or the random number generation module 12 returns to step S12. On the other hand, in a case where the bit string configured with the effective bits reaches the specified bit number (YES in S15), the processing of the CPU 11 or the random number generation module 12 ends as shown in FIG. 7.

As described above, in the information processing device 10 according to the present modification, information on the number of effective bits is stored in the memory (for example, RAM 17, flash memory 18). That is, the information processing device 10 stores, in a memory (for example, RAM 17, flash memory 18), the number of effective bits corresponding to the standard deviation, which is determined in advance by the bit extraction unit 14 of the random number generation module such as an external device (for example, information processing device 80). Therefore, the information processing device 10 can omit the processing of determining the number of effective bits when generating a random number and a processing speed of the information processing device 10 can be improved. Further, by omitting the random number generation module, the information processing device can be configured more simply.

Second Embodiment

In the first embodiment, after the random number generation operation is started, processing for determining the number of effective bits is performed in principle. The second embodiment shows a case where the number of effective bits is determined only in a predetermined estimation timing described later.

Since the hardware configuration of the information processing device 10 according to the second embodiment is the same as that of the information processing device 10 according to the first embodiment, the same components as those in the first embodiment are denoted by the same reference numerals, and the description thereof is simplified or omitted.

FIG. 8 is a flowchart showing in detail an example of a random number generation operation procedure in the information processing device according to the second embodiment.

In the random number generation operation procedure shown in FIG. 8, the same processes as those in the random number generation operation procedure of the first embodiment are denoted by the same step numbers, and the description thereof is simplified or omitted.

The fluctuation estimation unit 13 as an example of an evaluation unit determines whether to estimate the magnitude of fluctuation or not (S1A). The determination of whether to estimate the magnitude of fluctuation or not is determined by, for example, whether a current time is the predetermined estimation timing. For example, when a preset time (units such as seconds, minutes, hours, days, months, and years) has elapsed, it is determined that the estimation timing has come. This is because if the magnitude of fluctuation is not estimated for a long period of time, there is a high possibility that the number of effective bits changes in conjunction with changes in the magnitude of fluctuation due to changes in the characteristics of the measured values (that is, the magnitude of fluctuation in the measured values).

In addition to the elapse of time, for example, when the number of bits of the generated measured values changes, it is determined that the estimation timing has come. This is because there is a high possibility that the number of effective bits changes with the change in the number of bits of the measured values. Further, when the temperature changes, it is determined that the estimation timing has come. This is because there is a high possibility that the number of effective bits changes due to temperature changes. Further, when a voltage supplied to the information processing device 10 or the external device changes, it is determined that the estimation timing has come. This is because there is a high possibility that the number of effective bits changes due to voltage changes. Further, when there is an instruction from an external device or an instruction from the administrator via the network, it is determined that the estimation timing has come. This is because it is necessary to periodically check the number of effective bits.

In a case where it is determined in step S1A that the magnitude of fluctuation is to be estimated (YES in S1A), the bit extraction unit 14 requests the fluctuation estimation unit 13 to perform the fluctuation estimation. Once receiving the fluctuation estimation request from the bit extraction unit 14, the fluctuation estimation unit 13 performs the processing of step S1 in the same manner as that in the first embodiment.

On the other hand, in a case where it is determined in step S1A that the magnitude of fluctuation is not to be estimated (NO in S1A), the fluctuation estimation unit 13 takes out the information on the number of effective bits stored in the memory (for example, RAM 17, flash memory 18) (S10). Thereafter, the bit extraction unit 14 performs the processing from step S5 as that in the first embodiment.

In a case where the bit string configured with the effective bits does not reach the specified bit number in step S8 (NO in S8), the processing of the CPU 11 or the random number generation module 12 returns to the processing of step S1A and repeats the same processing.

As described above, in the information processing device 10 according to the second embodiment, the fluctuation estimation unit 13 as an example of the evaluation unit derives and evaluates the magnitude of fluctuation (for example, standard deviation) in the measured values. Further, the fluctuation estimation unit 13 derives the magnitude of fluctuation (for example, standard deviation) in the measured values by the same method as in the first embodiment when the estimation timing (in other words, fluctuation timing evaluation timing) has come. As a result, the information processing device 10 or the random number generation module 12 can determine the number of effective bits when the measured values of the noise source fluctuates with an appropriate fluctuation that has a normal distribution, and can ensure the uniformity of random numbers. If the estimation timing is not appropriate, the processing of determining the number of effective bits can be omitted, and the load on the information processing device 10 can be reduced.

Third Embodiment

In the first and second embodiments, the correspondence table Tb1 used for determining the number of effective bits indicates the number of effective bits corresponding to the standard deviation. In this correspondence table Tb1, as an example of determining that the fluctuation in the measured values is small and has no suitability for generating the random number, when the standard deviation is a value of 1 to 5, the value of the number of effective bits is set to 0, and an effective bit cannot be generated (that is, the effective bits cannot be extracted). In the third embodiment, even in a case where the fluctuation in the measured values is large, the number of effective bits corresponding to the standard deviation is 1 or more, and the random number can be generated, a range of the standard deviation for generating a random number can still be specified by an administrator or a user.

The hardware configuration of the information processing device 10 according to the third embodiment has almost the same configuration as the information processing device 10 according to the first embodiment. The same components as those in the first embodiment are denoted by the same reference numerals, and the description thereof is simplified or omitted.

FIG. 9 is a table showing a correspondence table Tb2 among the standard deviation, the number of effective bits, and random number generation possibility in the third embodiment.

The correspondence table Tb2 is created in advance by the user of the information processing device 10, and is stored in the memory (RAM 17, flash memory 18). The correspondence table Tb2 shows an example of the number of effective bits corresponding to the standard deviation, and the random number generation possibility indicating whether or not a random number can be generated by the information processing device 10 corresponding to the number of the effective bits. Specifically, in the correspondence table Tb2, when the standard deviation is 1 to 5, the number of effective bits is 0, when the standard deviation is 6 and 7, the number of effective bits is 1, and when the standard deviation is 8, the number of effective bits is 2. When the standard deviation is 1 to 8, it is registered that the information processing devices 10 and 80 are out of normal operation and with a possibility of abnormality, and a random number or a seed are not generated. Here, the abnormality indicates a state in which, for example, an operation deviating from an operation guarantee range for ensuring a predetermined operation guarantee years of the information processing devices 10 and 80 is performed (in other words, operation in a failure or at the time just before a failure about to fail). The operation guarantee range is a range of standard deviation and average value assumed in the specifications of the noise source. Reasons for deviating from the operation guarantee range are, for example, failure (immediately before failure) and deterioration over time. Further, it is registered that the number of effective bits is 2 when the standard deviation is 9 and 10, and the number of effective bits is 3 when the standard deviation is 11 to 13. When the standard deviation is 13 or more, it is registered that the information processing devices 10 and 80 are out of normal operation and with a possibility of abnormality, and a random number or a seed are not generated. Thus, in the correspondence table Tb2, even if there is a number of effective bits corresponding to the standard deviation, the number of effective bits is obtained assuming that the standard deviation in the range specified by the user (specified range) is 9 to 12 as normal.

In the present embodiment, the bit extraction unit 14 as an example of a notification unit has a health check function. When the standard deviation and the average value received from the fluctuation estimation unit 13 are out of the specified range (see above), the bit extraction unit 14 determines that the noise source ns is abnormal (for example, an electronic component (for example, the low speed oscillator 24) in the information processing devices 10 and 80 functioning as a noise source), instructs the communication I/F circuit 20 to notify the external device or the like of a message indicating a warning or abnormality, and ends the random number generation operation. When notifying the message indicating a warning or abnormality, the bit extraction unit 14 instructs the communication I/F circuit 20 to notify the standard deviation and the average value together. When instructing the notification of message indicating a warning or abnormality, the random number generation operation is not ended, and the bit extraction unit 14 may sample the measured values directly from the noise source ns, extract effective bits from the measured values, and transmit the extracted effective bits to the bit concatenation unit 15.

FIG. 10 is a flowchart showing in detail an example of a random number generation operation procedure in the information processing device 10 according to the third embodiment.

In the random number generation operation procedure shown in FIG. 10, the same processes as those in the random number generation operation procedure of the first embodiment are denoted by the same step numbers, and the description thereof is simplified or omitted.

In FIG. 10, the fluctuation estimation unit 13 as an example of the evaluation unit samples the noise source ns to acquire a plurality of measured values, and derives (calculates) an average value and a standard deviation by using the plurality of acquired measured values (S1B). The bit extraction unit 14 determines whether or not the average value of the measured values is within a specified range assumed by the user (S2A). Here, a range (specified range) in which the average value of the measured values is assumed to be an appropriate value is set in advance by the user, and is registered in the memory of the information processing device. Further, in step S2A, the bit extraction unit 14 determines whether or not the standard deviation is within a specified range indicated by the correspondence table Tb2.

In a case where the average value and the standard deviation are both within the specified ranges (YES in S2A), similarly to the first embodiment, the bit extraction unit 14 determines the number of bits corresponding to the standard deviation in step S3. Since the subsequent processing is the same as those of the first embodiment, description thereof is omitted.

On the other hand, in a case where at least one of the average value and the standard deviation is not within the specified range (NO in S2A), the bit extraction unit 14 instructs the communication I/F circuit 20 to notify a warning or abnormality to at least one of the administrator terminal 40 and the smartphone 60, which are external devices in step S9 (S9). Accordingly, the information processing device 10 notifies a warning or abnormality to at least one of the administrator terminal 40 and the smartphone 60, which are external devices. Thereafter, the processing of the CPU 11 or the random number generation module 12 ends as shown in FIG. 10.

As described above, in the information processing device 10 according to the third embodiment, the fluctuation estimation unit 13 as an example of the evaluation unit derives and evaluates the magnitude of fluctuation (for example, standard deviation) in the measured values. The bit extraction unit 14 as an example of the second acquisition unit derives information on the number of effective bits when the fluctuation estimation unit 13 determines that the standard deviation is within the specified range. In addition, in a case where the fluctuation estimation unit 13 determines that the standard deviation is out of the specified range, the bit extraction unit 14 instructs the communication I/F circuit 20 to notify a warning or abnormality (alarm notification) to at least one of the administrator terminal 40 and the smartphone 60 (external devices). As a result, the information processing device 10 or the random number generation module 12 can determine the number of effective bits in a case where the average value and the standard deviation are within the specified range, so that a random number can be generated using the number of effective bits corresponding to the standard deviation that the user considers effective for random number generation. Therefore, the user's intention can be reflected in the random number generation.

Further, in a case where at least one of the average value and the standard deviation is out of the specified range, the information processing device 10 or the random number generation module 12 can omit the processing for determining the number of effective bits, so that the load on the information processing device 10 can be reduced. In addition, since a warning (alarm) is notified to the administrator terminal 40 and the smartphone 60, the user can know that at least one of the average value and the standard deviation of the measured values is out of the specified range.

Here, in determining whether the value is within the specified range, both the average value and the standard deviation are used, but only the standard deviation may be used without using the average value. That is, in a case where the standard deviation is within the range specified by the user, the number of effective bits may be determined. Therefore, the processing of determining the number of effective bits can be simplified.

Although the embodiments are described above with reference to the drawings, it is needless to say that the present invention is not limited to such examples. It will be apparent to those skilled in the art that various changes and modifications can be conceived within the scope of the appended claims, and it is to be understood that they also belong to the technical scope of the disclosure. Each component in the embodiments described above may be combined freely in the range without deviating from the spirit of the invention.

The present application is based on a Japanese patent application (NO. 2017-095963) filed on May 12, 2017, the contents of which are incorporated by reference in this application.

INDUSTRIAL APPLICABILITY

The present disclosure is useful as a random number generation device, an information processing device and a random number generation method with which random numbers matched to the magnitude of fluctuation in measured values obtained at the time of operation are effectively generated using a simple configuration, and cost increase of a device as a whole is prevented.

REFERENCE SIGNS LIST

5 information processing system
10 information processing device
11 CPU
12 random number generation module
13 fluctuation estimation unit
14 bit extraction unit
15 bit concatenation unit
40 administrator terminal
60 smartphone
ns noise source

The invention claimed is:

1. A random number generation device, comprising:
a communication circuit configured to communicate with a device via a network;
a processor; and
at least one memory including a program that, when executed by the processor, causes the processor to perform operations, the operations including:
acquiring a measured value from a noise source, the measured value having bits of M digits, M being an integer exponent of a power of two;
acquiring, based on the measured value, information on a number of effective bits of N digits configured to be used for generating random numbers, N being an integer less than M and greater than zero;
generating, using the information on the number of effective bits, a random number having effective bits of L digits, L being a predetermined integer greater than or equal to N; and
causing the communication circuit to start a secure connection with the device via the network using the random number,
wherein the processor acquires the information on the number of effective bits based on a magnitude of fluctuation in the measured value in a predetermined period.

2. The random number generation device according to claim 1,
wherein the processor acquires the information on the number of effective bits corresponding to the magnitude of fluctuation using a table in which the magnitude of fluctuation in the measured value is associated with the number of effective bits.

3. The random number generation device according to claim 1, wherein the operations further include:
outputting an alarm to an external device when the information on the number of effective bits is not able to be acquired.

4. The random number generation device according to claim 1,
wherein the at least one memory stores the information on the number of effective bits.

5. The random number generation device according to claim 1, wherein the operations further include:
evaluating the magnitude of fluctuation in the measured value,
wherein the processor evaluates the magnitude of fluctuation in the measured value in accordance with a timing of the evaluating of the magnitude of fluctuation in the measured value.

6. The random number generation device according to claim 1, wherein the operations further include:
evaluating the magnitude of fluctuation in the measured value,
wherein the processor acquires the information on the number of effective bits when the magnitude of fluctuation in the measured value falls within a specified range.

7. The random number generation device according to claim 6, wherein the operations further include:
outputting an alarm to an external device when the magnitude of fluctuation in the measured value falls out of the specified range.

8. A random number generation method, comprising:
acquiring, by a processor, a measured value from a noise source, the measured value having bits of M digits, M being an integer exponent of a power of two;

acquiring, by the processor and based on the measured value, information on a number of effective bits of N digits configured to be used for generating random numbers, N being an integer less than M and greater than zero;

generating, by the processor and using the information on the number of effective bits, a random number having effective bits of L digits, L being a predetermined integer greater than or equal to N; and causing a communication circuit to start a secure connection with a device via a network using the random number, wherein the information on the number of effective bits is acquired by the processor based on a magnitude of fluctuation in the measured value in a predetermined period.

9. A random number generation device, comprising:

a communication circuit configured to communicate with a device via a network;

a processor; and at least one memory including a program that, when executed by the processor, causes the processor to perform operations, the operations including:

acquiring a measured value from a noise source, the measured value having bits of M digits, M being an integer exponent of a power of two;

acquiring, based on the measured value, information on a number of effective bits of N digits configured to be used for generating random numbers, N being an integer less than M and greater than zero;

generating, using the information on the number of effective bits, a random number having effective bits of L digits, L being a predetermined integer greater than or equal to N; and causing the communication circuit to start a secure connection with the device via the network using the random number, wherein the at least one memory stores the information on the number of effective bits.

10. A random number generation device, comprising:

a communication circuit configured to communicate with a device via a network;

a processor; and a memory including a program that, when executed by the processor, causes the processor to perform operations, the operations including:

acquiring a measured value from a noise source, the measured value having bits of M digits, M being an integer exponent of a power of two;

evaluating a magnitude of fluctuation in the measured value;

acquiring, based on the measured value and in accordance with a timing of the evaluating of the magnitude of fluctuation in the measured value, information on a number of effective bits of N digits configured to be used for generating random numbers, N being an integer less than M and greater than zero;

generating, using the information on the number of effective bits, a random number having effective bits of L digits, L being a predetermined integer greater than or equal to N; and causing the communication circuit to start a secure connection with the device via the network using the random number.

11. A random number generation device, comprising:

a communication circuit configured to communicate with a device via a network;

a processor; and a memory including a program that, when executed by the processor, causes the processor to perform operations, the operations including:

acquiring a measured value from a noise source, the measured value having bits of M digits, M being an integer exponent of a power of two;

evaluating a magnitude of fluctuation in the measured value;

acquiring, when the magnitude of fluctuation in the measured value falls within a specified range and based on the measured value, information on a number of effective bits of N digits configured to be used for generating random numbers, N being an integer less than M and greater than zero;

generating, using the information on the number of effective bits, a random number having effective bits of L digits, L being a predetermined integer greater than or equal to N; and causing the communication circuit to start a secure connection with the device via the network using the random number.

* * * * *